(12) United States Patent
Cowham et al.

(10) Patent No.: US 8,676,968 B2
(45) Date of Patent: Mar. 18, 2014

(54) DETERMINING INFORMATION ABOUT A COMPUTING SYSTEM

(75) Inventors: Adrian Cowham, Fair Oaks, CA (US); Serge Zelenov, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 13/206,218

(22) Filed: Aug. 9, 2011

(65) Prior Publication Data

US 2013/0041999 A1    Feb. 14, 2013

(51) Int. Cl.
*G06F 15/173*    (2006.01)
(52) U.S. Cl.
USPC .............. 709/224; 709/220; 709/248; 714/20
(58) Field of Classification Search
USPC .......................................... 709/224
See application file for complete search history.

(56) References Cited

U.S. PATENT DOCUMENTS

| | | | |
|---|---|---|---|
| 6,915,353 B2* | 7/2005 | Burkes et al. .................. 709/248 |
| 7,251,748 B2* | 7/2007 | Liberty et al. .................. 714/20 |
| 7,383,290 B2* | 6/2008 | Mehra et al. ........................... 1/1 |
| 7,454,665 B2 | 11/2008 | Manadue | |
| 7,634,690 B2 | 12/2009 | Barsness et al. | |
| 2008/0270837 A1 | 10/2008 | Kiefer et al. | |
| 2008/0320257 A1* | 12/2008 | Cowham et al. .............. 711/161 |
| 2009/0006035 A1* | 1/2009 | Bourne et al. ................ 702/183 |
| 2009/0106596 A1 | 4/2009 | Fallen et al. | |
| 2013/0041999 A1* | 2/2013 | Cowham et al. .............. 709/224 |

OTHER PUBLICATIONS

Configuration Audit Trail. DeltaV Product Data Sheet. Emerson:Process Management. Sep. 2009, pp. 1-5. <www.EmersonProcess.com/DeltaV>.

* cited by examiner

*Primary Examiner* — Tauqir Hussain

(57) ABSTRACT

In a method for determining information about a computing system, a designated process in the computing system is monitored. A determination whether a selected event has occurred in the designated process is made. State information and configuration information regarding the computing device is collected in response to a determination that the selected event has occurred. Meta information associated with the designated process is determined in response to a determination that the selected event has occurred. The state information, the configuration information and the meta information is recorded in an accessible file.

13 Claims, 4 Drawing Sheets

DETERMINING INFORMATION ABOUT A COMPUTING SYSTEM

BACKGROUND

System administrators use information pertaining to computing systems for various reasons, including failure analysis/debugging, system optimization, and auditing. The computing system information is typically retrieved manually or through automated processes. Manual retrieval of computing system information is prone to errors and unnecessary duplication of information. Automated processes for retrieving computing system information are known to consume large amounts of time and system resources because automated processes are often implemented to retrieve the computing system information at set intervals of time.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are a method and apparatus for determining information about a computing system. In the method, a designated process in the computing system is monitored for a selected event. A determination as to whether the selected event has occurred in the designated process is made. State information and configuration information regarding the computing system are collected in response to a determination that the selected event has occurred. Meta information associated with at least one of the designated process and the collection of the state information and the configuration information is determined. In addition, the state information, the configuration information and the meta information are recorded in a data store.

Through implementation of the method and apparatus disclosed herein, a collecting utility may execute automatically and may allow an administrator to keep a consistent set of logs about a computing system and events affecting the computing system. A designated process may automatically trigger the collecting utility, which may collect the state and configuration information only when the selected event is determined to have occurred to thereby substantially minimize the number of logs that are generated. Additionally, the method and apparatus disclosed herein directly link the state and configuration information with the meta information to facilitate diagnostic and other processes to be performed, for instance, by a system administrator.

Figure 1:
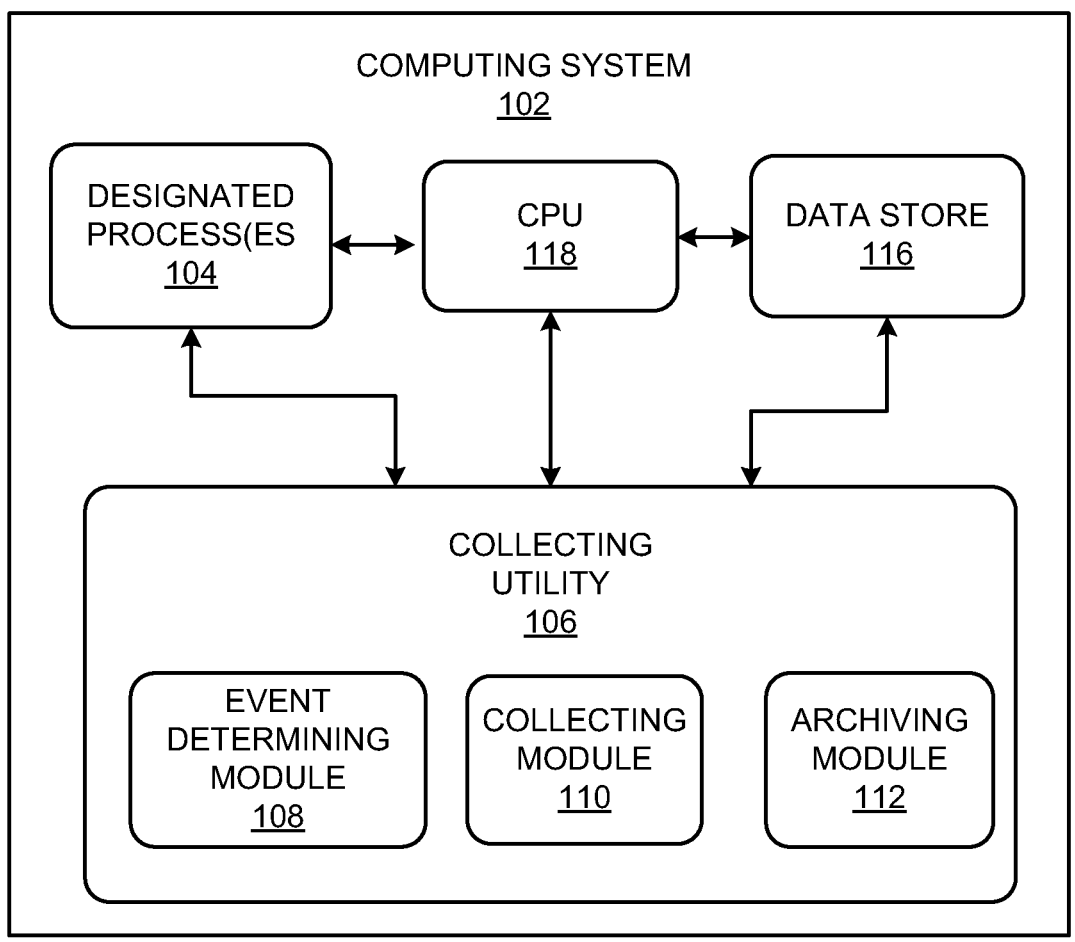
FIG. 1 shows a block diagram of a computing system, according to an example of the present disclosure.

With reference first to FIG. 1, there is shown a simplified block diagram 100 of a computing system 102, according to an example. As depicted in FIG. 1, the computing system 102 includes at least one designated process 104, a collecting utility 106, a data store 116, and a central processing unit (CPU) 118. The computing system 102 may comprise, for instance, a database, a web server, a single computing device, device network switch, a router, etc. It should be clearly understood that the computing system 102 may include additional components and that some of the components described herein may be removed and/or modified without departing from a scope of the computing system 102. As such, the computing system 102 may include any number of designated processes 104, and other components of a computing system 102 including memory devices, CPUs 118 and operating systems. In addition, although the collecting utility 106 has been depicted as being contained within a computing system 102 for which information is to be determined, the collecting utility 106 may be contained within a computing system (not shown) that is separate from the computing system 102 for which information is to be determined.

Generally speaking, the designated process(es) 104 comprises a long-running and persistent system service, a single-run configuration process, or any other process that is executed automatically or by user manipulation on the computing system 102. More particularly, for instance, the designated process(es) 104 may comprise a process implemented in either hardware or software on the computing system 102 that a user has designated to be monitored to trigger implementation of the collecting utility 106. According to an example, the designated process 104 comprises machine-readable instructions that are executed by the CPU 118. According to another example, the designated process 104 is implemented in a hardware device that performs a particular program or application in the computing system 102.

The collecting utility 106 comprises a hardware device and/or machine readable instructions that may be implemented to collect state information, configuration information, and meta information in response to a selected event occurring, as discussed in greater detail herein below. The selected event may comprise a specific event(s) or may be determined based on predetermined rules for the designated process 104, for instance, user initiated changes in configuration settings of the designated process 104. Generally speaking, an event is any specific result of any decision or computation made by a designated process. Any specific event that occurs in the designated process may be considered to be a selected event. For example, a self-test is performed, a specific component has a specific outcome in a self-test, any user-configurable setting is altered by the user, a specific CPU utilization level is reached, etc. In this regard, the selected event may comprise any event that a system administrator may have any interest in.

The state information may comprise system information for the computing system 102, such as the physical state of the system, status of particular hardware and/or software components, and/or results of any system readiness test or component self-test. For example, the computing system 102 may comprise a computing device and the state information may comprise a system self test for an operating system in the computing device. Generally speaking, the state information is the specific stage at which a designated process is currently running, including any run-time information that is gathered or learned by the designated process. For example, the designated process may be in the "powering-on" stage, "exchanging information with its neighbor devices" stage, "idle" stage, etc. The learned information may include, for instance, that the temperature of the CPU is X degrees, that there is a functional telephone line connected to the system, the identification information of the three other devices on the LAN that have exchanged neighbor information with the designated process, etc.

The state information may also include the current stage of the designated process if the execution of the designated process is like a state machine. The state information may be related to the activity of the designated process, and may also include the physical state, which may include the state of physical components directly related to the designated process. For a networking device, the physical state may be the list of neighboring devices that the designated process has detected on the LAN. For example, if the designated process is a IP-telephony management process, the physical state may include the phone numbers of the VoIP telephones currently plugged in to the computing system and the state of the telephone lines plugged in to the system from the telephone company.

The configuration information may comprise information regarding a current configuration of the designated process 104. For example, the configuration information may comprise configuration settings or configuration files of the computing system 102 or particular hardware and/or software of the computing system 102. According to an example, the configuration information includes running configuration information for the computing system 102. Generally speaking, the "running configuration" is the combination of the persistent (startup) configuration and any applicable state information. For example, if the persistent configuration on a networking device states that the network port has to acquire a network (IP) address automatically (for instance, DHCP), then the running configuration may be "acquired automatic address of 1.2.3.4". For a device that is exchanging network routing information, the running configuration may include the list of neighbor devices that have exchanged routing information with the current device. The running configuration information may also include items that are always generated/determined during operation and are not substantially persistent. For instance, the computing system 102 may comprise a networking device and the running configuration information may include information for other devices with which the computing system 102 is networked. For instance, the running configuration information may include routing table information and other information incident to operation of the computing system 102 that the computing system 102 is not conventionally required to persistently store.

The meta information generally includes any relevant information that is outside of the designated process. For example, the length of time or amount of system resources that the designated process took to complete the latest task, a list of other processes currently executing, the system/CPU utilization level, system uptime, total number of users on the system, a timestamp of the execution of the collecting utility 106, a timestamp of when the selected event was determined to have occurred, user information of the user that triggered the designated process 104, user information of the user that caused the selected event to occur, a total run time of the designated process 104, a total run time of the collecting utility 106 in collecting the state information and the configuration information, and any other predetermined information that may be associated with the overall computing system 102 or specifically the execution of the collecting utility 106 and the tracking of the selected event. Generally speaking, the meta information may include any run-time information that is not directly related to the result of the computation performed by the designated process.

Figure 4:
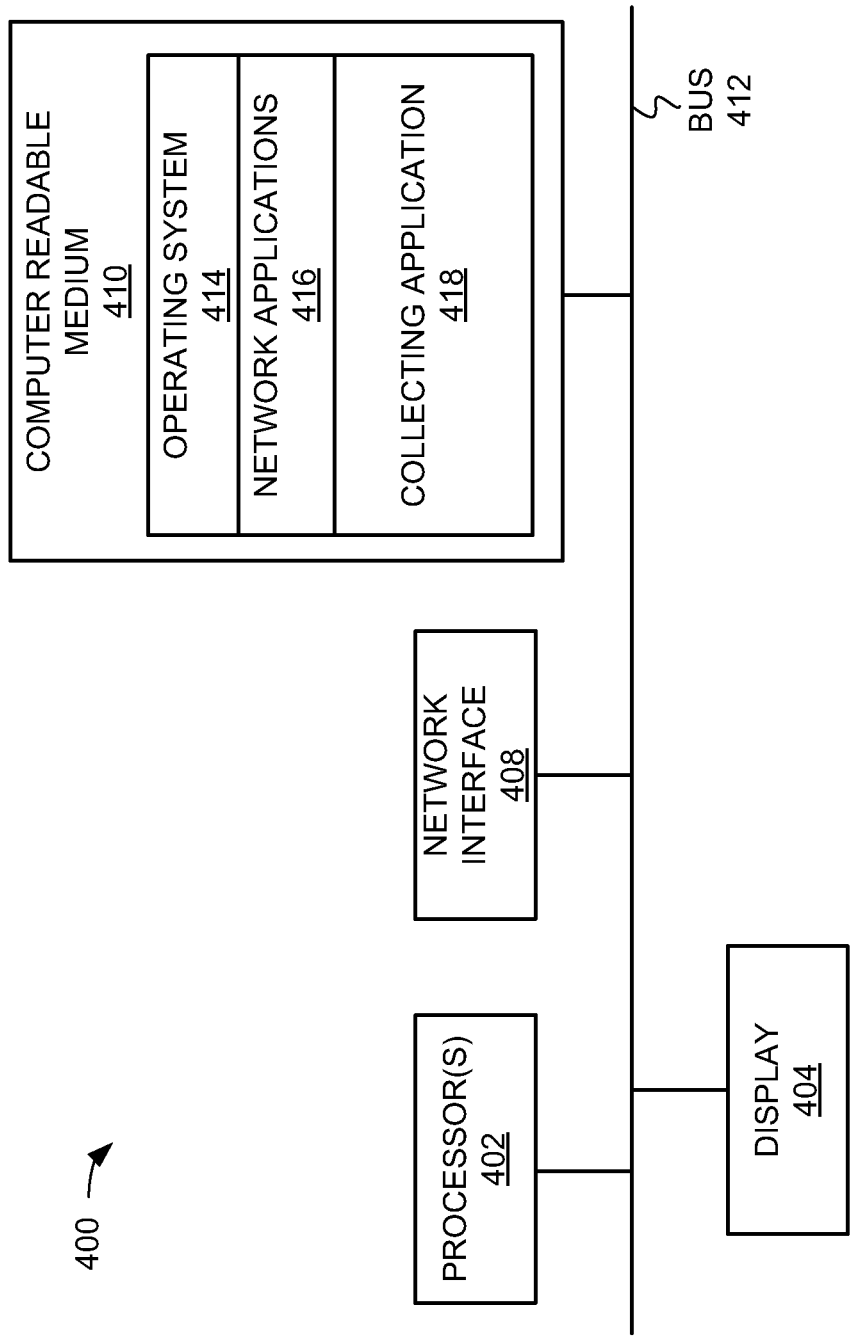
FIG. 4 illustrates a computer system, which may be employed to perform various functions described herein, according to an example of the present disclosure.

As shown in FIG. 1, the collecting utility 106 includes an event determination module 108, a collecting module 110, and an archiving module 112. The modules 108-112 may comprise at least one software module and/or at least one hardware module. The modules 108-112 may thus comprise machine readable instructions that may be stored, for instance, in a volatile or non-volatile memory, such as DRAM, EEPROM, MRAM, flash memory, floppy disk, a CD-ROM, a DVD-ROM, or other optical or magnetic media, and the like, and executable by a processor of a computing device, for instance, as depicted in FIG. 4. According to another example, each of the modules 108-112 comprises a hardware device, such as, a circuit or multiple circuits arranged on a board. According to a further example, the modules 108-112 comprise a combination of machine-readable instructions and hardware modules.

In any regard, the event determination module 108 may be implemented to monitor the designated process 104 and to determine whether the selected event(s) has occurred. For instance, instructions may be provided for the event determination module 108 to monitor the designated process 104 for the selected event(s). Additionally, a system administrator of the computing system 102 may select the designated process 104, and the selected events that trigger the event determining module 108. For instance, the system administrator may select the designated process 104, and associated selected events from a predetermined set of designated processes and selected events. The events that trigger the event determining module 108 may be based and selected upon the designated process(es) 104. By way of particular example, the selected event may be a particular state change and/or reconfiguration of the designated process 104, a user-initiated action of the designated process 104, etc.

The collecting module 110 may collect state information and configuration information regarding the computing system 102 in response to a determination by the event determining module 108 that the selected event has occurred. For instance, the collecting module 110 may take a snapshot of the current state and configuration of the computing system 102 when prompted to do so by the event determining module 108. As another example, the collecting module 110 may take a snapshot of the current state and configuration of designated hardware and/or software of the computing system 102 when prompted by the event determining module 108.

As a further example, the collecting module 110 may take a snapshot of the current state and configuration of the designated process 104. In this example the designated process 104 may create logs on a substantially continuous basis or upon selected events and provide these logs when prompted by the collecting module 110 at the occurrence of the selected events. The designated process 104 may create the logs, for instance, using a system state logging utility (not shown).

The collecting module 110 may also determine meta information associated with at least one of the designated process and the collection of the state information and the configuration information. Examples of meta information are discussed above.

The archiving module 112 may be implemented to record the state information, the configuration information and the meta information in the data store 116. More particularly, for instance, the archiving module 112 may automatically archive the state information and the configuration information with the meta information, for instance, a timestamp and a user identification. The state information and the configuration information may be organized in the data store 116 by using the meta information, such that the state information and the configuration information may be retrieved from the data store 116 through use of the meta information. According to an example, the collecting utility 106 records the state information and the configuration information in text or binary format in the data store 116 with the associated meta information.

The data store 116 may comprise a memory device, such as but not limited to random access memory (RAM), hard disk drives and/or removable storage drives including a floppy diskette drive, a magnetic tape drive, a compact disk drive, etc., where the system information, configuration information, and the meta information may be stored. In addition, although the data store 116 has been depicted as being internal to the computing system 102, the data store 116 may be externally located with respect to the computing system 102 without departing from a scope of the computing system 102.

A system administrator may access the results of each execution of the collecting utility 106 and analyze and compare the results with results of other executions of the collecting utility 106 to understand the progression of the configuration, status, or state change of the designated process 104 and the computing system 102.

Figure 2:
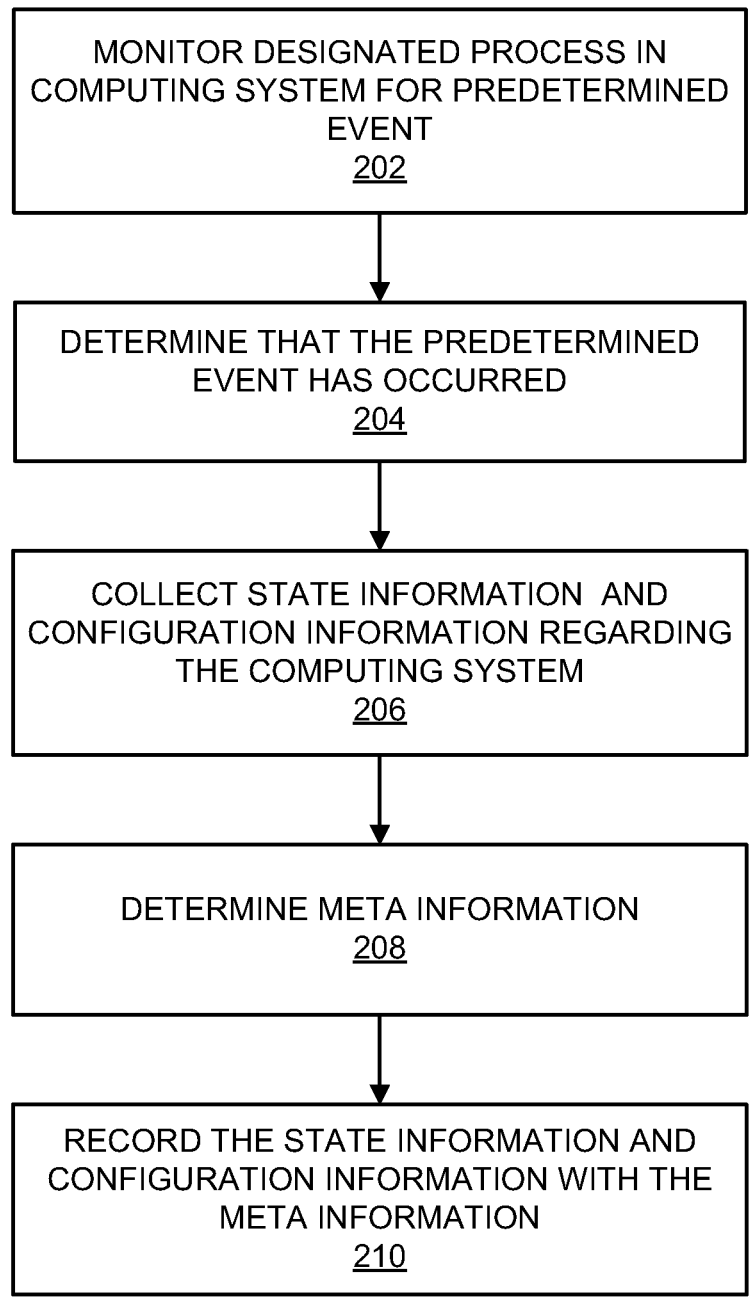
FIGS. 2 and 3, respectively, show flow diagrams of methods for determining information about a computing system, according to examples of the present disclosure.
Figure 3:
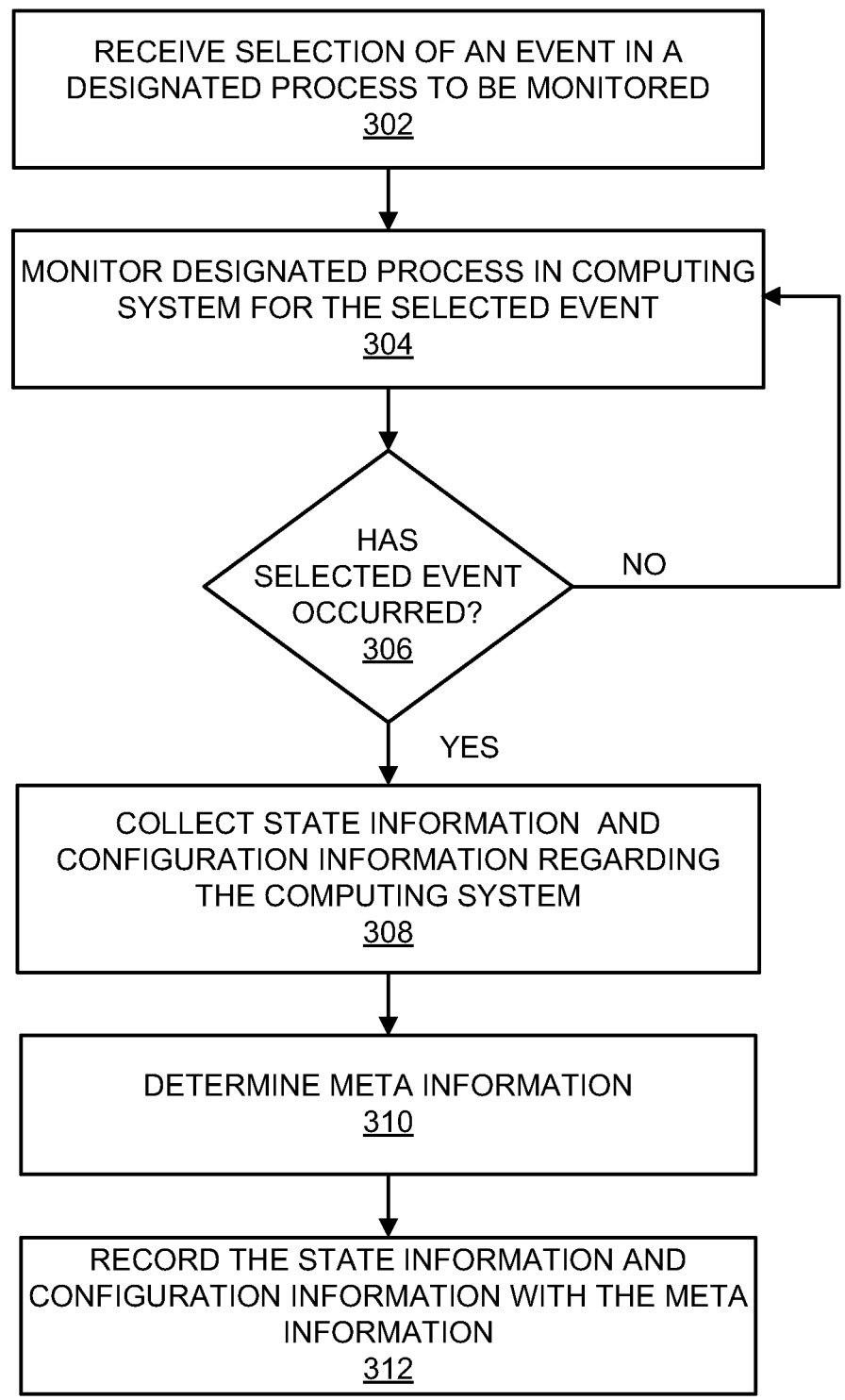

Various manners in which the collecting utility 106 may operate are discussed with respect to FIGS. 2 and 3, which respectively show flow diagrams of methods 200 and 300 for determining information about a computing system 102, according to two examples. It should be readily apparent that the methods 200 and 300 depicted in FIGS. 2 and 3 represent generalized illustrations and that other operations may be added or existing operations may be removed, modified or rearranged without departing from the scopes of the methods 200 and 300. In addition, although particular reference is made herein to the collecting utility 106 as performing the various operations in the methods 200 and 300, it should be understood that the operations may be implemented by a differently configured collecting utility 106. Although particular reference is also made to a single designated process and a single selected event, it should be understood that the methods 200 and 300 may be implemented with multiple designated processes and selected events without departing from the scopes of the methods 200 and 300.

With reference first to FIG. 2, at block 202, a designated process 104 is monitored for the occurrence of a selected event, for instance, by the event determination module 108. The event determination module 108 may monitor activity of the designated process 104 to determine whether the selected event has occurred. The event for which the designated process 104 is monitored may be selected by a system administrator of the computing system 102, a user of the computing system 102, a manufacturer or programmer of the designated process 104, a manufacturer or programmer of the computing system 102, etc.

At block 204, a determination that the selected event has occurred is made, for instance, by the event determination module 108. Thus, for instance, the event determining module 108 may track a user's actions with respect to the designated process 104 and may determine that the selected event has occurred when the user performs an action (that is, the particular user action corresponds to the selected event).

At block 206, state information and configuration information for the computing system 102 are collected, for instance by the collecting module 110. As discussed above, the collecting module 110 may take a snapshot of the computing system 102, designated software and/or hardware components of the computing system 102, or both to collect the state information and the configuration information. In one example, the collecting module 110 may query a processor of the computing system 102 to obtain the state and configuration information. The collecting module 110 may also collect running configuration information, as discussed above. According to an example, the state information and the configuration information are collected only in response to a determination that the selected event has occurred in the designated process 104.

At block 208, the meta information associated with at least one of the designated process 104 and the collection of the state information and the configuration information is determined, for instance by the collecting module 110. Various examples of the meta information are provided above with respect to the discussion of FIG. 1.

At block 210, the state information, configuration information and the meta information are recorded in the data store 116, for instance by the archiving module 112. According to an example, the archiving module 112 organizes the stored state information and the configuration information according to the meta information determined at block 208. Thus, for instance, the state information and the configuration information may be archived in the data store 116 in manners that enable the information to be readily retrievable through the meta information.

Following block 210, the method 200 may be repeated for the same designated process 104 or for another designated process. In addition, the method 200 may be implemented using the same or different selected event.

Turning now to FIG. 3, at block 302, a selection of an event in a designated process 104 to be monitored is received, for instance, by the collecting utility 106. As discussed above, a user of the computing system 102, an administrator, programmer, manufacturer, etc., may select the process and event at block 302.

At block 304, the designated process 104 is monitored for the occurrence of the selected event, for instance, by the event determination module 108. The designated process 104 may be monitored as discussed above.

At block 306, a determination as to whether the selected event has occurred is made, for instance, by the event determination module 108. In response to a determination that the selected event has not occurred, the event determination module 108 may continue to monitor the designated process 104 for occurrence of the selected event at block 304. However, in response to a determination that the selected event has occurred, at block 308, state information and configuration information for the computing system 102 are collected, for instance by the collecting module 110. In addition, at block 310, meta information associated with at least one of the designated process 104 and the collection of the state information and the configuration information is determined, for instance by the collecting module 110.

At block 312, the state information, configuration information and the meta information are recorded in the data store 116, for instance by the archiving module 112, as discussed above with respect to block 210 in the method 200.

Following block 312, the method 300 may be repeated for the same designated process 104 or for another designated process. In addition, the method 300 may be implemented using the same or different selected event.

Some or all of the operations set forth in the methods 200 and 300 may be contained as utilities, programs, or subprograms, in any desired computer accessible medium. In addition, the methods 200 and 300 may be embodied by computer programs, which may exist in a variety of forms both active and inactive. For example, they may exist as machine-readable instructions, including source code, object code, executable code or other formats. Any of the above may be embodied on a computer readable storage medium.

Examples of computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Turning now to FIG. 4, there is shown a schematic representation of a computing device 400 configured in accordance with examples of the present disclosure. The device 400 includes a processor 402, such as a central processing unit; a display device 404, such as a monitor; a network interface 408, such as a Local Area Network LAN, a wireless 802.11x LAN, a 3G mobile WAN or a WiMax WAN; and a computer-readable medium 410. Each of these components is operatively coupled to a bus 412. For example, the bus 412 may be an EISA, a PCI, a USB, a FireWire, a NuBus, or a PDS.

The computer readable medium 410 may be any suitable medium that participates in providing instructions to the processor 402 for execution. For example, the computer readable medium 410 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 410 may also store other machine-readable instructions, including word processors, browsers, email, Instant Messaging, media players, and telephony machine-readable instructions.

The computer-readable medium 410 may also store an operating system 414, such as Mac OS, MS Windows, Unix, or Linux; network applications 416; and a collecting application 418. The operating system 414 may be multi-user, multiprocessing, multitasking, multithreading, real-time and the like. The operating system 414 may also perform basic tasks such as recognizing input from input devices, such as a keyboard or a keypad; sending output to the display 404; keeping track of files and directories on the computer readable medium 410; controlling peripheral devices, such as disk drives, printers, image capture device; and managing traffic on the bus 412. The network applications 416 include various components for establishing and maintaining network connections, such as machine-readable instructions for implementing communication protocols including TCP/IP, HTTP, Ethernet, USB, and FireWire.

The collecting application 418 provides various machine readable instructions for determining information about a computing system. The collecting application 418 collects state information, configuration information, and meta information for a computing system in response to a selected event occurring with respect to a designated process, as discussed above. In addition, the collecting application 418 causes the state information, configuration information, and the meta information to be stored in a searchable manner in a data store. In certain examples, some or all of the processes performed by the application 418 may be integrated into the operating system 414. In certain examples, the processes may be at least partially implemented in digital electronic circuitry, or in computer hardware, machine-readable instructions (including firmware and/or software), or in any combination thereof.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for determining information about a computing system, said method comprising:
   monitoring, by a processor, a designated process in the computing system for a selected event;
   determining that the selected event has occurred in the designated process;
   collecting state information and configuration information regarding the computing system in response to the determination that the selected event has occurred;
   determining meta information associated with at least one of the designated process and the collection of the state information and the configuration information, wherein the meta information comprises at least one of a timestamp of when the selected event was determined to have occurred, information pertaining to a user that caused the selected event to occur, and a total run time of a collecting utility in collecting the state information and the configuration information; and
   recording the state information, the configuration information and the meta information in a data store.

2. The method according to claim 1, wherein collecting state information and configuration information further comprise collecting state information and configuration information regarding at least one of a predefined hardware and software component of the computing system.

3. The method according to claim 1, wherein collecting state information and configuration information further comprise collecting at least one of configuration settings of the computing system, configuration files of the computing system, and results of a computing system test.

4. The method according to claim 1, wherein collecting state information and configuration information comprises collecting the state information and the configuration information only in response to a determination that the selected event has occurred in the designated process.

5. The method according to claim 1, wherein recording the state information, the configuration information and the meta information further comprises:
   archiving the state information and the configuration information organized according to the meta information in the data store.

6. The method according to claim 1, wherein collecting the state information further comprises collecting information pertaining to a physical state of the computing system, wherein the physical state is a stage at which the designated process is currently running.

7. The method according to claim 1, wherein the computing system comprises a networking device and wherein collecting the configuration information further comprises collecting running configuration information for at least one other device that is networked with the computing system.

8. An apparatus for determining information about a computing system, the apparatus comprising:
   a processor; and
   a memory having machine-readable instructions that are to cause the processor to:

monitor a designated process in the computing system for a selected event, determine whether the selected event has occurred in the designated process, collect state information and configuration information regarding the computing system in response to a determination that the selected event has occurred, determine meta information associated with at least one of the designated process and the collection of the state information and the configuration information in response to a determination that the selected event has occurred, determine at least one of a timestamp of when the selected event was determined to have occurred, information pertaining to a user that caused the selected event to occur, and a total run time of a collecting utility in collecting the state information and the configuration information, and record the state information, the configuration information and the meta information in a data store.

9. The apparatus according to claim 8, wherein the machine-readable instructions are to further cause the processor to collect state information and configuration information regarding at least one of a predefined hardware and software component of the computing system.

10. The apparatus according to claim 8, wherein the machine-readable instructions are to further cause the processor to collect at least one of configuration settings of the computing system, configuration files of the computing system, and results of a computing system test.

11. The apparatus according to claim 8, wherein the machine readable instructions are to further cause the processor to collect the state information and the configuration information only in response to a determination that the selected event has occurred in the designated process.

12. The apparatus according to claim 8, wherein the machine readable instructions are to further cause the processor to archive the state information and the configuration information organized according to the meta information in the data store.

13. A non-transitory computer readable storage medium comprising machine-readable instructions that when executed by a processor, cause the processor to:

receive selection of an event related to a designated process in the computing system to be monitored;

monitor the designated process in the computing system for the selected event;

determine whether the selected event has occurred in the designated process;

collect state information and configuration information regarding the computing system in response to a determination that the selected event has occurred;

determine meta information associated with at least one of the designated process and the collection of the state information and the configuration information, wherein the meta information comprises at least one of a timestamp of when the selected event was determined to have occurred, information pertaining to a user that caused the selected event to occur, and a total run time of a collecting utility in collecting the state information and the configuration information; and record the state information, the configuration information and the meta information in a data store.

\* \* \* \* \*